UNITED STATES PATENT OFFICE.

JULIUS ALBRECHT, OF FRANKFORT-ON-THE-MAIN, GERMANY.

PREPARATION FOR TREATING TEETH.

1,205,957. Specification of Letters Patent. Patented Nov. 28, 1916.

No Drawing. Application filed January 4, 1913. Serial No. 740,191.

*To all whom it may concern:*

Be it known that I, JULIUS ALBRECHT, a subject of the German Emperor, and resident of Frankfort-on-the-Main, Germany, have invented certain new and useful Improvements in Preparations for Treating Teeth, of which the following is a specification.

It is well known that, in stopping carious teeth whose pulp, or tooth nerve, is in a condition of decay, it is necessary to first destroy and remove the decayed contents of the root channels, and to treat them repeatedly with disinfectants, or the like, before filling up the teeth with stopping materials, this treatment necessitating somewhat troublesome and frequently very painful operations.

The object of the present invention is to provide a liquid preparation by means of which it is possible in a single operation to render the diseased teeth harmless and also to stop the roots, or other parts, of the said teeth, it being no longer necessary to remove the contents of the root channels before stopping a tooth.

The preparation is made by dissolving a phenol, and particularly a poly-hydroxyphenol such as resorcin, pyrogallol, etc., in formaldehyde and diluting the solution with glycerin or other viscous liquid substance which dilutes the mixture of the phenol and formaldehyde and delays their chemical reaction. The preparation thus obtained is then introduced into the root channels of the diseased tooth with a solution of a hardening or condensing agent which will produce or expedite the reaction between the phenol and the formaldehyde such as an acid, or an alkali. The liquid preparation spreads through the interior of the tooth, thoroughly disinfecting the same and thereby rendering the contents of the root channels, perfectly harmless; it finally solidifies, according to the proportions used, to a gelatinous, or solid mass, which constitutes a filler for the root, or the like, rendering the tooth sound and useful again.

Instead of resorcin, another phenol such as pyrogallol, either as such or in the form of its hydrate (phloroglucin) etc., may be used, and in lieu of glycerin, a concentrated sugar solution, or other viscous substance, which is readily miscible in any desired proportion with water, may be employed.

Glycerin, or a sugar solution, is added because although it does not take part in the reaction, it causes a retardation of the condensation effect on account of its viscosity. Without such an addition, the condensation effect would take place so rapidly and so violently and with such an evolution of heat that the process would be useless for the object in view.

The following examples will further illustrate how the invention may be carried out, but the invention is not limited to said examples.

Example I: 5 parts by weight of resorcin are dissolved in 25 parts by volume of formaldehyde of 1.081 specific gravity. This solution is mixed with 25 parts by volume of glycerin of 1.23 specific gravity and with 5 parts by volume of a solution of sodium hydroxid of 1.116 specific gravity. Time required for hardening 8¾ hours.

Example II: 5 parts by weight of resorcin are dissolved in 25 parts by volume of formaldehyde of 1.081 specific gravity. To this solution are added 25 parts by volume of glycerin of 1.23 specific gravity and to initiate the condensation 2 parts by volume of sulfuric acid of 1.1 specific gravity are mixed therewith. Time required for hardening 4 hours.

Example III: 5 parts by weight of pyrogallol are mixed with 5 parts by volume of formaldehyde of 1.081 specific gravity and to the solution so formed are added 2 parts by volume of glycerin of 1.23 specific gravity; the solution is condensed, while being cooled with water, with 2 parts by volume of soda lye of 1.250 specific gravity. Time required for hardening 11 hours 40 minutes.

Example IV: 5 parts of weight of pyrogallol are dissolved with 5 parts by volume of formaldehyde of 1.081 specific gravity and to the solution so formed are added 2 parts by volume of glycerin of 1.23 specific gravity, the condensation being initiated with 2 parts by volume of sulfuric acid of 1.050 specific gravity while the mass is cooled by water. Time required for hardening 1 hour 20 minutes.

The preparation of the present invention, illustrated by the above examples, is a liquid preparation which, because of its fluid nature, is able to penetrate into the smallest openings and cavities of the teeth and to disinfect and fill these spaces. Because of this fact, and because the liquid is converted into a solid in the tooth, it is possible to fill teeth without first grinding away the decayed parts, since these parts are disinfected, conserved and filled by the solid product formed. The liquid preparation hardens but gradually, the presence of the glycerin or other liquid diluent or retarder acting to retard the reaction between the phenol and the formaldehyde, while the condensing agent, added subsequently to the glycerin or other viscous retarder, is also retarded in its condensing action.

In order that the tooth roots and cavities may be thoroughly sterilized and conserved it is necessary that the filling material be thinly fluid when used and that it remain fluid and insure thorough sterilization of even the finest cavities. Accordingly the preparation of the present invention is made in the form of a thin fluid, which will remain fluid for a considerable time, and which will penetrate even the finest of the tooth cavities. Since the application of heat is precluded, it is necessary that the preparation be one which will harden without external heating, and also one which will harden without any objectionable self-heating. Any danger of such objectionable self-heating is avoided by cooling the preparation before use, as described in Examples I and II, so that the further slow hardening takes place at about the normal body temperature. The presence of the glycerin helps to keep the preparation thinly fluid as well as to retard the hardening and prevent objectionable self-heating, while still permitting slow hardening of the preparation by the condensing agent. The penetration of the preparation is also promoted by the glycerin. Moreover, the glycerin also retards the action of the excess of formaldehyde (that part not entering into chemical reaction) so that the disinfecting action is extended over a considerable period of time. Thus in the preparation of Examples I and II an excess of formaldehyde is used which, owing to the retarding action of the glycerin, exerts a disinfecting action for a period of one or more days. By varying the amount of glycerin the hardness of the filling can be varied, so that, for example, relatively soft temporary fillings can be readily made and extracted with ease afterward. The same thorough disinfecting action is, however, still obtained in the case of such temporary fillings.

I claim:—

1. A liquid preparation for use in preserving and filling roots of teeth, comprising a solution of a phenol in formaldehyde, diluted with a viscous retarding agent, and combined with a condensing agent, said preparation being in a thinly fluid form adapted to penetrate into the smallest cavities, and being slowly self-hardening without objectionable self-heating at body temperatures.

2. A liquid preparation for use in preserving and filling roots of teeth, comprising a solution of resorcin in formaldehyde, diluted with a viscous retarding agent, and combined with a condensing agent, said preparation being in a thinly fluid form adapted to penetrate into the smallest cavities, and being slowly self-hardening without objectionable self-heating at body temperatures.

3. A liquid preparation for use in preserving and filling roots of teeth, comprising a solution of a phenol in formaldehyde, diluted with glycerin, said preparation being in a thinly fluid form adapted to penetrate into the smallest cavities, and being slowly self-hardening without objectionable self-heating at body temperatures.

4. A liquid preparation for use in preserving and filling roots of teeth, comprising a solution of resorcin in formaldehyde, diluted with glycerin, said preparation being in a thinly fluid form adapted to penetrate into the smallest cavities, and being slowly self-hardening without objectionable self-heating at body temperatures.

5. A liquid preparation for use in preserving and filling roots of teeth, comprising a solution of a phenol in an excess of formaldehyde, diluted with a viscous retarding agent, and combined with a condensing agent, said preparation being in a thinly fluid form adapted to penetrate into the smallest cavities, and being slowly self-hardening without objectionable self-heating at body temperatures.

6. A liquid preparation for use in preserving and filling roots of teeth, comprising a solution of about 5 parts by weight of resorcin in about 25 parts by volume of formaldehyde of 1.081 specific gravity, said solution being diluted with glycerin and combined with a condensing agent, said preparation being in a thinly fluid form adapted to penetrate into the smallest cavities, and being slowly self-hardening without objectionable self-heating at body temperatures.

In testimony whereof I have signed my name to this specification in the presence of two subscribing witnesses.

JULIUS ALBRECHT.

Witnesses:
 FRANZ HASSLACHER,
 JOHANNA CULLMANN.